(12) United States Patent
Robinson

(10) Patent No.: US 12,384,263 B2
(45) Date of Patent: Aug. 12, 2025

(54) SYSTEMS AND METHODS FOR AN ELECTRIC MACHINE

(71) Applicant: Caterpillar Inc., Peoria, IL (US)

(72) Inventor: Andrew B. Robinson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 493 days.

(21) Appl. No.: 17/674,497

(22) Filed: Feb. 17, 2022

(65) Prior Publication Data

US 2023/0256842 A1      Aug. 17, 2023

(51) Int. Cl.
| | | |
|---|---|---|
| *B60L 53/18* | (2019.01) | |
| *B60H 1/00* | (2006.01) | |
| *B60L 58/26* | (2019.01) | |
| *B60L 58/27* | (2019.01) | |
| *F15B 21/042* | (2019.01) | |

(52) U.S. Cl.
CPC .......... *B60L 53/18* (2019.02); *B60H 1/00657* (2013.01); *B60H 1/00742* (2013.01); *B60L 58/26* (2019.02); *B60L 58/27* (2019.02); *F15B 21/042* (2013.01); *B60L 2240/62* (2013.01); *B60L 2240/662* (2013.01)

(58) Field of Classification Search
CPC .......... B60L 53/18; B60L 58/27; B60L 58/26; B60L 2240/62; B60H 1/00657
See application file for complete search history.

(56) References Cited

U.S. PATENT DOCUMENTS

| | | | |
|---|---|---|---|
| 8,620,506 B2* | 12/2013 | Kummer | H01M 10/486 180/65.21 |
| 10,293,654 B2 | 5/2019 | Treharne et al. | |
| 10,640,004 B2 | 5/2020 | Patel | |
| 11,650,071 B2* | 5/2023 | Chhajer | G06F 3/1462 701/409 |
| 2014/0012447 A1 | 1/2014 | Gao et al. | |
| 2018/0086181 A1* | 3/2018 | Connell | B60H 1/3208 |
| 2018/0297483 A1 | 10/2018 | Pevear et al. | |
| 2018/0304765 A1* | 10/2018 | Newman | B60L 58/26 |
| 2018/0334170 A1* | 11/2018 | Liu | B60W 10/30 |
| 2019/0342739 A1* | 11/2019 | Shah | H04W 4/46 |

(Continued)

OTHER PUBLICATIONS

Optiwatt, "Tesla Extreme Weather Considerations—How To Optimize Your Tesla Driving For Winter Months", Tesla Owners Club New York State, Dec. 16, 2020 (7 pages).

*Primary Examiner* — Jelani A Smith
*Assistant Examiner* — Toya Pettiegrew
(74) *Attorney, Agent, or Firm* — Bookoff McAndrews PLLC

(57) ABSTRACT

A machine charging system includes a machine, a charging unit, at least one user locator, and a control system. The machine may include one or more batteries, a cab, and a temperature control system. The charging unit may be configured to be removably coupled to the machine via a cable. The control system may include a controller in communication with the at least one user locator and the cab temperature control system. When the controller detects that the at least one user locator is within a predetermined distance from the machine while the machine is coupled to the charging unit, the controller may initiate one or more pre-start or pre-conditioning procedures with the temperature control system to control a temperature of one or more components of the machine.

20 Claims, 4 Drawing Sheets

(56) References Cited

U.S. PATENT DOCUMENTS

| | | | |
|---|---|---|---|
| 2021/0195367 A1* | 6/2021 | Li | H04W 4/029 |
| 2021/0394636 A1* | 12/2021 | Meyer | B60L 53/14 |
| 2022/0259825 A1* | 8/2022 | Cliff | B60L 58/14 |
| 2022/0371609 A1* | 11/2022 | Vollmann | B60W 40/08 |
| 2023/0120453 A1* | 4/2023 | Rao | H04L 12/2838 |
| | | | 340/4.3 |
| 2023/0278449 A1* | 9/2023 | Kinsey | B60L 53/62 |
| | | | 701/22 |

* cited by examiner

SYSTEMS AND METHODS FOR AN ELECTRIC MACHINE

TECHNICAL FIELD

The present disclosure relates generally to an electric machine or vehicle, and more particularly, to systems and methods for charging, starting, or otherwise conditioning one or more parameters of an electric machine or vehicle.

BACKGROUND

The present disclosure relates to systems and methods for machines or vehicles that are used in construction and/or repairs, for example, in earth-moving procedures such as road construction, mining, etc. Specifically, the present disclosure relates to systems and methods for electric vehicles, and to one or more start-up procedures. Electric vehicles, for example, wheel loaders, excavators, trucks (e.g., dump trucks, haul trucks, articulated dump trucks, etc.), track-type tractors (i.e., bulldozers), graders, etc., include one or more batteries that may be charged while the vehicle is not in operation, for example, overnight. Before the vehicle can be used, the vehicle often must undergo one or more start-up or conditioning procedures. For example, the start-up or conditioning procedure(s) may include warming the one or more batteries, a motor, a cab, and/or hydraulic system(s) (i.e., in cold climates), cooling the one or more batteries, a motor, a cab, and/or hydraulic system(s) (i.e., in hot climates), or otherwise conditioning one or more elements or portions of the vehicle before operation. The conditioning (e.g., heating, cooling, etc.) of the start-up procedure(s) may draw a load (i.e., a parasitic load) from the one or more batteries, which may reduce the available power for the remainder of the operation of the vehicle, reducing the available operational time and/or operational power for the vehicle. Additionally, in some aspects, the start-up procedure(s) may delay the operation of the vehicle or may otherwise affect the operation and/or efficiency of the vehicle.

U.S. Pat. No. 8,620,506, issued to Kummer et al. on Dec. 31, 2013 ("the '506 patent"), describes a method and system for thermal management of a battery for a vehicle. The method and system of the '506 patent include a controller configured to regulate a temperature of the battery to within an operating temperature range when the vehicle is operating. The method and system of the '506 patent also includes conditioning the battery to a battery drive temperature when the ambient temperature is outside an environmental temperature range and when the battery is connected to the charger and power source. Additionally, the method and system of the '506 patent include conditioning a cabin in the vehicle to a cabin temperature when the ambient temperature is outside the environmental temperature range and when the battery is connected to the charger and power source. However, the conditioning of the battery and the cabin in the '506 patent is dependent on a predicted vehicle start time or a predicted departure time (e.g., disconnection from the charger and power source) based on a user's operating habits.

The systems and methods of the present disclosure may address or solve one or more of the problems set forth above and/or other problems in the art. The scope of the current disclosure, however, is defined by the attached claims, and not by the ability to solve any specific problem.

SUMMARY

In one aspect, a machine charging system may include a machine, a charging unit, at least one user locator, and a control system. The machine may include one or more batteries, a cab, and a temperature control system. The charging unit may be configured to be removably coupled to the machine via a cable. The control system may include a controller in communication with the at least one user locator and the cab temperature control system. When the controller detects that the at least one user locator is within a predetermined distance from the machine while the machine is coupled to the charging unit, the controller may initiate one or more pre-start or pre-conditioning procedures with the temperature control system to control a temperature of one or more components of the machine.

In another aspect, a method of automatically initiating one or more pre-start or pre-conditioning procedures for a machine having one or more batteries may include detecting that the machine is in a charging mode. The charging mode may include the machine being coupled to a charging unit, and the machine may include a cab. The method may also include determining one or more parameters for initiating the one or more pre-start or pre-conditioning procedures for the machine. The method may further include receiving one or more locational parameters for at least one user locator. The method may also include, when the one or more location parameters for the at least one user locator are within the determine parameters, initiating the one or more pre-start or pre-conditioning procedures to control a temperature of the cab while the machine is coupled to the charging unit.

In yet another aspect, a machine charging system may include a machine, a charging unit, at least one user locator, and a control system. The machine may include one or more batteries, a battery temperature control system powered by the one or more batteries, a cab, and a cab temperature control system powered by the one or more batteries. The charging unit may be configured to be removably coupled to the machine via a cable. The control system may include a controller in communication with the at least one user locator, the battery temperature control system, and the cab temperature control system. When the controller detects that the at least one user locator is within a predetermined distance from the machine while the machine is coupled to the charging unit, the controller may initiate one or more pre-start or pre-conditioning procedures with the battery temperature control system to control a temperature of the battery and with the cab temperature control system to control a temperature of the cab.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, system, or apparatus that comprises a list of elements does not include only those elements, but may include other elements not expressly listed or inherent to such a process, method, article, or apparatus. Further, relative terms, such as, for example, "about," "substantially," "generally," and "approximately" are used to indicate a possible variation of ±10% in a stated value.

Figure 1:
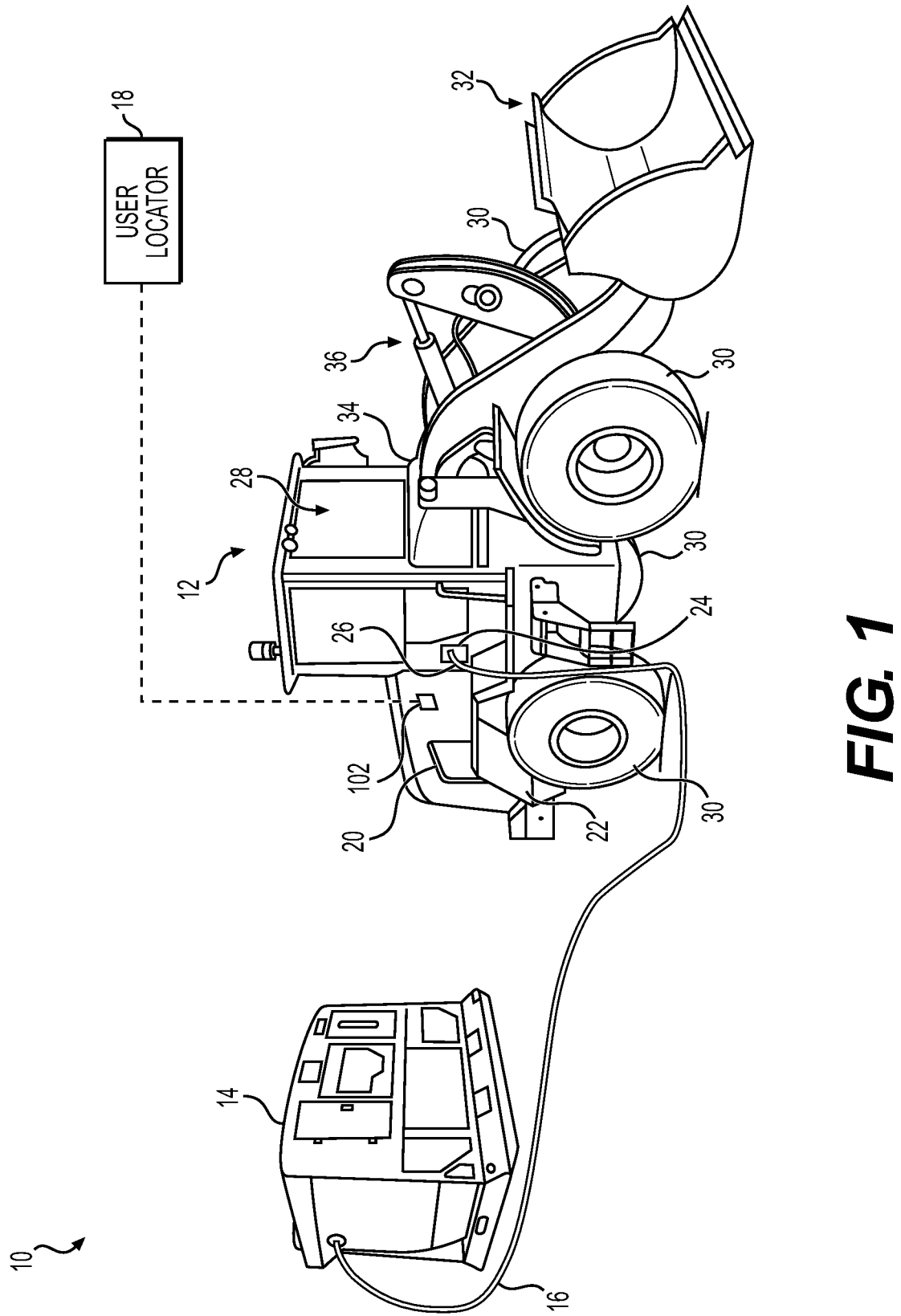
FIG. 1 is an illustration of an exemplary system, according to aspects of this disclosure.

FIG. 1 illustrates a perspective view an exemplary system 10, for example, a machine or a vehicle charging system. System 10 may include a machine or vehicle 12, a power station or charging unit 14, and one or more connections or cables 16. System 10 may also include one or more user devices or user locators 18, for example, a cellphone, smartphone, tablet, or other device that includes a locational detection unit (e.g., a GPS unit) and/or interacts with a geofence, a network, position sensors, or other locational identifying systems or devices. Alternatively, the one or more user locators 18 may be integrated into an operator's vehicle, for example, integrated into a navigation unit, controller, a GPS unit, or otherwise integrated into or coupled to the operator's personal vehicle. In another alternative, the one or more user locators 18 may be integrated into a vest, for example, a reflective operator vest. Furthermore, system 10 may include a control system 100 (FIG. 2), including one or more controllers 102, sensors, control units or systems, etc. The one or more controllers 102 may be in communication (e.g., via a wireless connection) with user locator 18. As discussed below, system 10 and other features below may help to initiate one or more pre-start or pre-conditioning procedures on vehicle 12 based on a position of one or more operators, for example, based on information received from the one or more user locators 18. The one or more pre-start or pre-conditioning procedures may include warming the one or more batteries, a motor, a cab, and/or hydraulic system(s) (i.e., in cold climates), cooling the one or more batteries, a motor, a cab, and/or hydraulic system(s) (i.e., in hot climates), or otherwise conditioning one or more elements or portions of the vehicle before operation.

As discussed herein, vehicle 12 is an electric vehicle powered by one or more batteries 20 and requires periodic charging, for example, overnight or when vehicle 12 is otherwise not in use. Alternatively, vehicle 12 may be at least partially electric, for example, a hybrid vehicle (i.e., including a battery and an engine). In these aspects, vehicle 12 includes one or more batteries 20, which may power a motor 22 and/or other components of vehicle 12. In one aspect, battery 20 may be positioned in a rear of vehicle 12, as shown in FIG. 1. Alternatively, battery 20 may be positioned anywhere on vehicle 12. Additionally, in some aspects, battery 20 may be removable, for example, to be charged away from vehicle 12, to be easily replaced with a charged battery 20 to extend the work time of vehicle 12, etc.

Vehicle 12 may include a charger coupling 24, for example, on a portion of vehicle 12 below or adjacent to a cab 28 or other operator environment. Charger coupling 24 may receive a mounting portion 26 of cable 16 to connect charging unit 14 to vehicle 12. Charger coupling 24 and mounting portion 26 may form a snap-fit connection or otherwise help couple cable 16 to vehicle 12. In one aspect, charging unit 14 may deliver direct current (DC) to battery 20, for example, via the connection of mounting portion 26 of cable 16 to charger coupling 24.

Vehicle 12 may include one or more ground engaging elements, for example, wheels 30, which may be driven by motor 22. In another aspect, vehicle 12 may instead have tracks (not shown). In some aspects, vehicle 12 may include cab 28, for example, in a central or forward portion of vehicle 12, from which one or more operators may operate and/or control one or more aspects of vehicle 12. As discussed below, cab 28 may be at least partially enclosed. Additionally, vehicle 12 may include one or more implements 32 (e.g., a bucket) coupled to and moveable relative to a machine frame 34. As shown, vehicle 12 may be a wheel loader with a bucket as implement 32. The bucket may be coupled to and movable relative to machine frame 34 via one or more hydraulic systems 36, including one or more sets of rods and cylinders that may be operated by the movement and/or pressurization of hydraulic fluid via one or more pumps. As discussed in greater detail below, vehicle 12 includes one or more temperature control systems 104, for example, one or more heating, ventilation, and air conditioning ("HVAC") systems, which may be powered by battery 20.

Although vehicle 12 is shown as a wheel loader including a bucket as implement 32, this disclosure is not so limited. For example, vehicle 12 may be an excavator with a bucket, a truck with a movable truck bed, a tractor with a blade, ripper, etc., a grader with a circle and grading blade, or any other vehicle or machine with a movable or positionable implement. In these aspects, battery 20 and/or motor 22 may help propel the machine or vehicle, and also may help to control the movement and/or position of the respective implements, for example, based on operator controls.

Charging unit 14 may be a portable charger assembly (i.e., movable around the worksite), or may be a permanently positioned charger assembly. As mentioned, charging unit 14 may supply direct current to battery 20 via cable(s) 16. In one or more aspect, charging unit 14 itself may be charged or otherwise powered via one or more connections to a power grid, generators or gensets, solar panels, wind turbines or wind power sources, hydroelectric sources, other power source (e.g., a source of alternating current or direct current). Charging unit 14 may include one or more internal batteries. Charging unit 14 may include one or more outputs, for example, to couple one or more vehicles 12 to charging unit 14 via one or more cables 16. In this aspect, charging unit 14 may provide power to the batteries 20 of more than one vehicle 12 via multiple cables 16. In one or more aspects, charging unit 14 may be a high-powered charger that can deliver approximately 500 Kilo Watts of power.

Cable 16 may include one or more conductive cables or wires (not shown), which can couple charging unit 14 to vehicle 12. The one or more conductive cables or wires may be configured to carry a high voltage, for example, approximately 500 Kilo Watts of power, from charging unit 14 to one or more vehicles 12. Cable 16 may include one or more insulating layers surrounding the conductive cables or wires. Cable 16 may be fixedly coupled to an output of charging unit 14. Alternatively, cable 16 may be removably coupled to the output of charging unit 14. Additionally, as mentioned above, cable 16 may include mounting portion 26 to couple cable 16 to vehicle 12.

As mentioned above, user locator 18 may be a cellphone, smartphone, tablet, or other device that includes a locational detection unit (e.g., a GPS unit) and/or interacts with a geofence, a network, or other locational identifying system. Alternatively, the one or more user locators 18 may be integrated into an operator's vehicle, for example, a GPS unit in the operator's personal vehicle. In these aspects, user locator 18 may be in communication with one or more other portions of system 10. Additionally, system 10 may initiate one or more pre-start or pre-conditioning procedures based at least in part on the location of user locator 18. For example, as discussed in detail below, system 10 may initiate one or more pre-start or pre-conditioning procedures based at least in part on a distance of user locator 18 from vehicle 12 (e.g., ¼ mile, ½ mile, ¾ mile, 1 mile, 2 miles, 3 miles, 5 miles, etc.) Alternatively or additionally, system 10 may initiate one or more pre-start or pre-conditioning procedures based at least in part on an estimated time it will take for user (based on user locator 18) to reach vehicle 12. In this aspect, system 10 may initiate one or more pre-start or pre-conditioning procedures when user locator 18 is between approximately 5 minutes and approximately 30 minutes away from vehicle 12, for example, between approximately 10 minutes and approximately 15 minutes from vehicle 12. The timing estimate may be based at least in part on a distance from user locator 18 to vehicle 12, may be based on a geofence (e.g., defined by a worksite or other locational features surrounding vehicle 12), etc. The one or more pre-start or pre-conditioning procedures may be based on other conditions as well, for example, an ambient temperature, temperatures of one or more components on vehicle 12, the type of vehicle 12, a distance of the operator or user locator 18 from the vehicle or other location (e.g., a remote operation location), etc.

Figure 2:
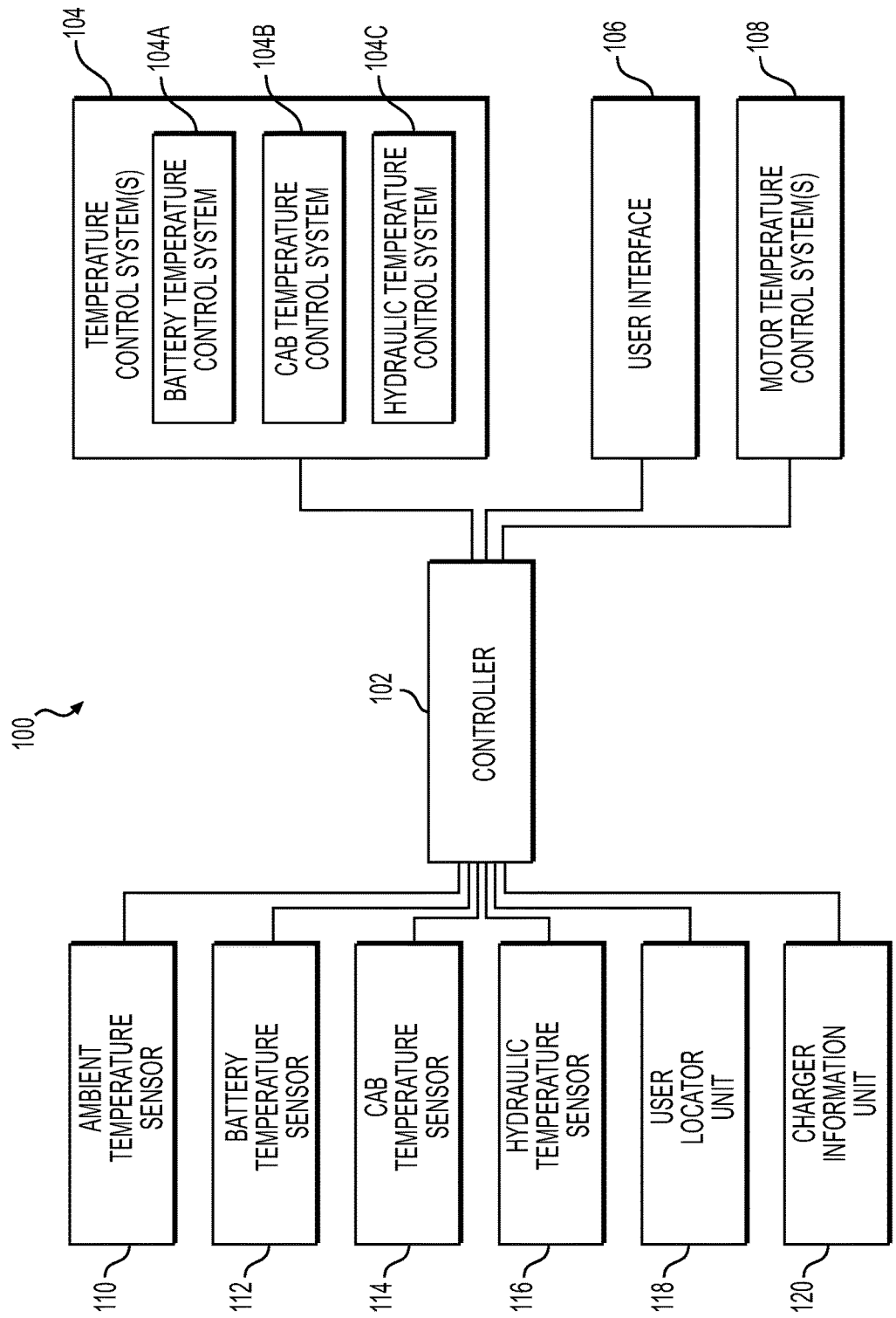
FIG. 2 is a schematic representation of a control system, according to aspects of this disclosure.

As discussed in detail below and as shown in FIG. 2, system 10 may also include a control system 100. Control system 100 may include a controller 102, for example, positioned on or within a portion of vehicle 12. Controller 102 may be in communication with one or more features of vehicle 12 and/or other portions of system 10. Controller 102 may receive inputs and send outputs, for example, in order to operate vehicle 12, including initiating one or more pre-start or pre-conditioning procedures on vehicle 12 based on a position of one or more operators, for example, based on information received from the one or more user locators 18. Although not shown, controller 102 may be coupled to or include one or more memory units, which may contain instructions for controller 102 to initiate the one or more pre-start or pre-conditioning procedure. Controller 102 may be a separate controller on vehicle 12 or may be integrated into a central vehicle controller (e.g., a main power or operation controller, etc.). Alternatively, controller 102 may be integrated into one or more of temperature control system(s) controller, a battery controller, a motor control module, or another dedicated control module on vehicle 12. In one aspect, machine 10 may be an electrohydraulic motor grader, and controller 102 may also control one or more electrical switches or valves in order to control one or more hydraulic cylinders or electrical elements in order to operate machine 10.

Controller 102 may embody a single microprocessor or multiple microprocessors that may include means for performing any of the operations mentioned herein. For example, controller 102 may include a memory, a secondary storage device, a processor, such as a central processing unit or any other means for accomplishing a task consistent with the present disclosure. The memory or secondary storage device associated with controller 102 may be non-transitory computer-readable media that store data and/or software routines that may assist controller 102 in performing its functions, such as the functions of method or process 400 of FIG. 4, as discussed below. Further, the memory or secondary storage device associated with controller 102 may also store data received from the various inputs or sensors associated with vehicle 12 and one or more other portions of system 10 or control system 100. Numerous commercially available microprocessors can be configured to perform the functions of controller 102. It should be appreciated that controller 102 could readily embody a general machine controller capable of controlling numerous other machine functions. Various other known circuits may be associated with controller 102, including signal-conditioning circuitry, communication circuitry, hydraulic or other actuation circuitry, and other appropriate circuitry. As discussed herein, controller 102 may receive various inputs (e.g., from various sensors and/or user locator 18), and based on the various inputs, controller 102 may signal the initiation of one or more pre-start or pre-conditioning procedures and/or determine the start time of the one or more pre-start or pre-conditioning procedures.

Figure 3:
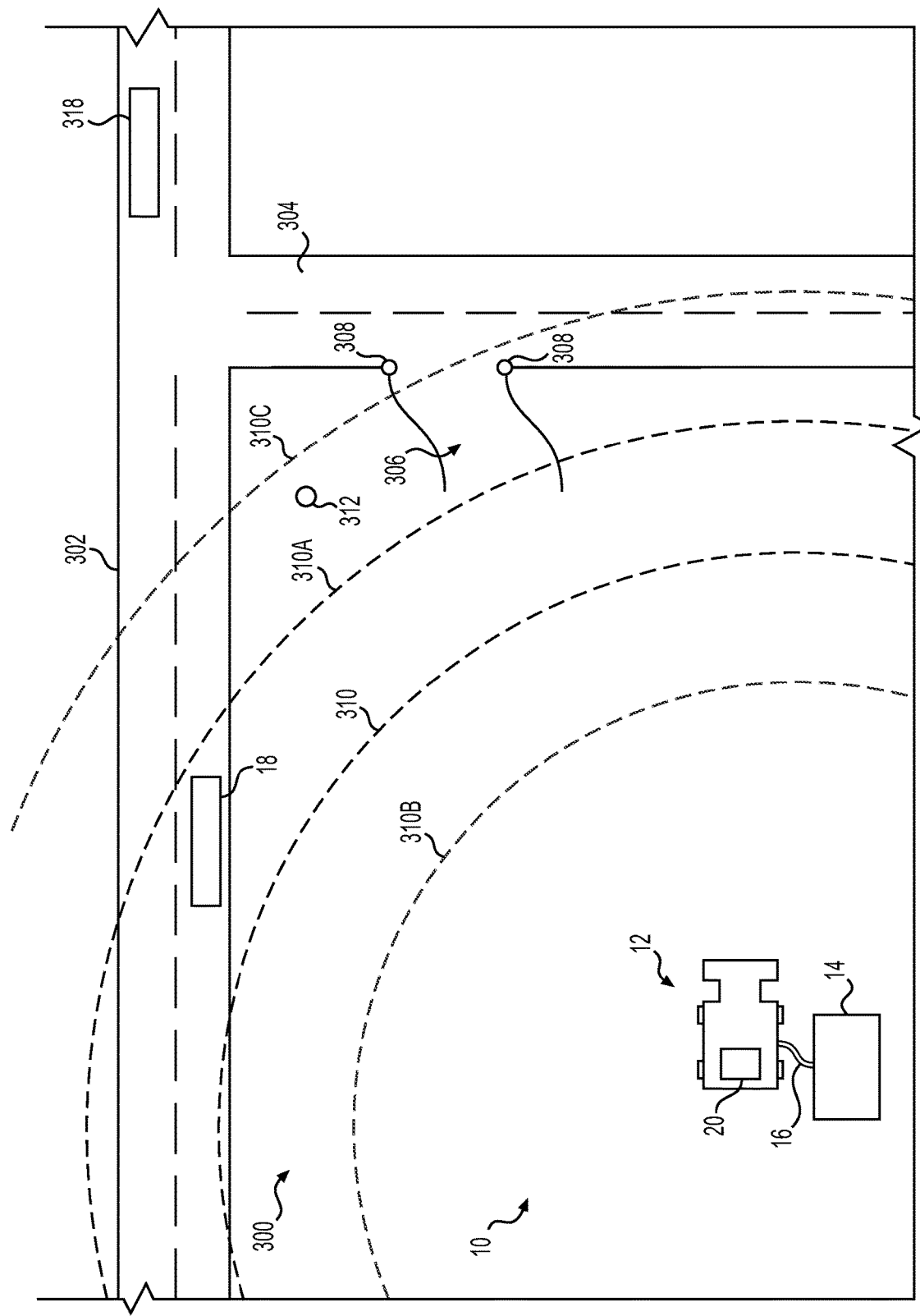
FIG. 3 is a top view of portions of the exemplary system on a worksite, according to aspects of this disclosure.

As shown in FIG. 2, control system 100 may also include one or more user interfaces 106, which may be positioned at one or more operator stations on vehicle 12, for example, in cab 28, and/or remote from vehicle 12 (e.g., at remote operation location 312 in FIG. 3). The one or more user interfaces 106 may include one or more touch screens displays, control panels, and/or one or more sets of buttons, switches, dials, or other inputs and/or one or more displays, screens, lights, etc. to receive instructions and convey information to a user. Controller 102 and user interface 106 may be coupled (e.g., wired or wirelessly). As discussed below, controller 102 and/or user interface 106 may help control various aspects of vehicle 12, including the one or more HVAC or temperature control systems 104.

As mentioned above, vehicle 12 includes one or more temperature control systems 104 (FIG. 2), which may be signaled or otherwise controlled and/or in communication with controller 102. The one or more temperature control systems 104 may help to control the temperature of one or more of battery 20, motor 22, cab 28, hydraulic systems 36, etc. The one or more temperature control system(s) 104 may include a plurality of separate temperature control systems, for example, with each temperature control system helping to control the temperature of different components or portions of vehicle 12. Alternatively, one or more HVAC or temperature control system(s) 104 may help to heat, ventilate, and/or cool multiple components of vehicle 12. For example, as shown in FIG. 2, a first temperature control system may be a battery HVAC or temperature control system 104A to help heat, ventilate, and/or cool battery 20. In one or more aspects, battery temperature control system 104A may include a water-based battery temperature control system, for example, to deliver, distribute, and/or pump water around one or more portions of battery 20 to help cool battery 20. In this aspect, battery temperature control system 104A may also include and/or control a battery cooling pump, for example, to control the delivery of water in the water-based battery temperature control system. Furthermore, in one or more aspects, battery temperature control system 104A may include an auxiliary heater, for example, to help heat (or warm) battery 20, for example, when vehicle 12 is in cold climates.

Additionally, a second HVAC or temperature control system may be a cab HVAC or temperature control system 104B to help heat, ventilate, and/or cool cab 28 or other operator environment, for example, on vehicle 12 (as shown in FIG. 1) or adjacent to or near vehicle 12 (e.g., for remote operation of vehicle 12 from another position on a worksite). For example, cab temperature control system 104B may include one or more HVAC units or other temperature control units (not shown) on vehicle 12, for example, positioned on top of cab 28. Cab temperature control system 104B may include one or more fans, heater cores, air conditioning condensers, etc. to help heat, ventilate, and/or cool cab 28.

Furthermore, a third HVAC or temperature control system may be a hydraulic HVAC or temperature control system 104C. Hydraulic temperature control system 104C may help to control the temperature of one or more components of hydraulic system 36, for example, one or more hydraulic motors, one or more hydraulic pumps, hydraulic fluid, etc. In these aspects, hydraulic temperature control system 104C may include one or more fans, heater cores, air conditioning condensers, etc. to help heat, ventilate, and/or cool one or more components of hydraulic system 36. In another aspect, hydraulic HVAC system 104C may include a water-based temperature control system, which may include one or more cooling pumps to control the delivery of water around one or more components of hydraulic system 36 (as discussed above with respect to battery temperature control system 104A) and/or one or more auxiliary heaters to help heat (or warm) one or more components of hydraulic system 36.

Additionally, control system 100 may include one or more motor temperature control system(s) 108, for example, to operate one or more fans to help ventilate and/or cool motor 22. Moreover, motor temperature control system(s) 108 may include one or more auxiliary heaters to help heat (or warm) motor 22. Control system 100 may also include one or more temperature sensors on or within motor 22, which may be in communication with controller 102 as well.

Although not shown, each of the one or more temperature control systems 104 and/or motor temperature control system 108 may include a control unit, for example, in communication with controller 102. Each control unit may signal the respective one or more temperature control systems 104 and/or motor temperature control system 108 to activate, heat, ventilate, cool, or otherwise help to control the temperature of the respective element of vehicle 12.

In addition, control system 100 may include one or more sensors or other input units. Controller 102 and/or user interface 106 may be coupled to (e.g., through a wired or wireless connection) the one or more sensors or one or more input units. For example, control system 100 may include one or more temperature sensors.

Control system 100 may include an ambient temperature sensor 110. Ambient temperature sensor 110 may be positioned on an exterior portion of vehicle 12. Alternatively, ambient temperature sensor 110 may be positioned on an exterior portion of charging unit 14, or otherwise positioned on a worksite adjacent to or near vehicle 12. Ambient temperature sensor 110 may send one or more signals to controller 102 indicative of an ambient temperature. In one aspect, ambient temperature sensor 110 may constantly or periodically send one or more signals to controller 102 indicative of the ambient temperature. Alternatively, ambient temperature sensor 110 may send one or more signals to controller 102 indicative of the ambient temperature upon the occurrence of one or more conditions. For example, ambient temperature sensor 110 may send one or more signals to controller 102 indicative of the ambient temperature when the temperature falls below a threshold (e.g., 10° C., 5° C., 0° C., –5° C., –10° C., –20° C., etc.) or is above a threshold (e.g., 25° C., 30° C., 35° C., 40° C., etc.). In another example, ambient temperature sensor 110 may send one or more signals to controller 102 indicative of the ambient temperature when controller 102 detects a certain position, location, distance, or other information of user locator 18 that is indicative of an operator approaching vehicle 12 or another location (e.g., a remote operating location).

Control system 100 may include one or more of a battery temperature sensor 112, a cab temperature sensor 114, and a hydraulic temperature sensor 116. Battery temperature sensor 112 may be positioned on or within a portion of battery 20, and may send one or more signals to controller 102 indicative of a temperature of battery 20. Cab temperature sensor 114 may be positioned within a portion of cab 28, and may send one or more signals to controller 102 indicative of a temperature within cab 28. Hydraulic temperature sensor 116 may be positioned on or within a portion of hydraulic system 36, and may send one or more signals to controller 102 indicative of a temperature of one or more components or portions of hydraulic system 36. As with ambient temperature sensor 110, one or more of a battery temperature sensor 112, a cab temperature sensor 114, and a hydraulic temperature sensor 116 may constantly or periodically send one or more signals to controller 102 indicative of the respective temperatures. Alternatively, one or more of a battery temperature sensor 112, a cab temperature sensor 114, and a hydraulic temperature sensor 116 may send one or more signals to controller 102 indicative of the respective temperatures upon the occurrence of one or more conditions. For example, one or more of a battery temperature sensor 112, a cab temperature sensor 114, and a hydraulic temperature sensor 116 may send one or more signals to controller 102 indicative of the respective temperatures when the ambient temperature and/or the respective temperatures falls below a threshold (e.g., 10° C., 5° C., 0° C., –5° C., –10° C., –20° C., etc.) or is above a threshold (e.g., 25° C., 30° C., 35° C., 40° C., etc.). In another example, one or more of a battery temperature sensor 112, a cab temperature sensor 114, and a hydraulic temperature sensor 116 may send one or more signals to controller 102 indicative of the respective temperatures when controller 102 detects a certain position, location, distance, or other information of user locator 18 that is indicative of an operator approaching vehicle 12 or another location (e.g., a remote operating location).

Additionally, control system 100 may include one or more user locator, communication, or information units. For example, control system 100 may include one or more user locator units 118, for example, coupled to or otherwise in communication (e.g., wired or wirelessly) with one or more user locators 18. User locator unit(s) 118 may be positioned on the one or more user locators 18, and may be in wireless communication with controller 102. User locator unit(s) 118 may include a global positioning system (GPS) unit. Alternatively, user locator unit(s) 118 may include a geotag, for example, which may interact with and/or send one or more signals when passing through or over a geofence or other location demarcation (e.g., passing through a gate, an opening in a fence, onto a worksite, etc.). In another aspect, user locator unit(s) 118 may be positioned on vehicle 12 (i.e., in cab 28), in which case user locator unit 118 may be in wireless communication with the one or more user locators 18 and in wired or wireless communication with controller 102. In any of these aspects, user locator unit(s) 118 may send one or more signals to controller 102 when user locators 18 is positioned at one or more locations or one or more distances (e.g., from vehicle 12). For example, as discussed below, user locator unit(s) 118 may send one or more signals to controller 102 when user locator 18 is within a predetermined distance of vehicle 12, a gate to the worksite, etc. Based at least in part on the predetermined distance, controller 102 may determine an estimated arrival time for the user to vehicle 12 or to another location (e.g., a remote operation location).

Furthermore, control system 100 may include a charger information unit 120. Charger information unit 120 may be coupled to or otherwise in communication with charging unit 14. For example, charger information unit 120 may send one or more signals to controller 102 with information about charging unit 14. In one or more aspects, charger information unit 120 may be configured to detect when charger 14 is connected to vehicle 12 (i.e., via cable 16), and may send one or more signals indicative of the connection to controller 102. Additionally, in one or more aspects, charger information unit 120 may send one or more signals to controller 102 concerning the level of power delivered from charging unit 14 to vehicle 12 and battery 20. Alternatively or additionally, charger information unit 120 may send one or more signals to controller 102 concerning the rate at which the power is delivered from charging unit 14 to vehicle 12 and battery 20, the rate at which the power is delivered from charging unit 14 to vehicle 12 and battery 20, the available power remaining on charging unit 14 (i.e., power stored on an internal battery of charging unit 14), or other details of charging unit 14.

Although not shown, control system 100 may include one or more additional sensors, user locator units, information units, control units, user interfaces, etc.

FIG. 3 illustrates a top view of portions of system 10. As shown, system 10 includes vehicle 12, charging unit 14, which may be connected to vehicle 12 via cable 16 to charge battery 20, and user locator 18. As shown, vehicle 12 and charging unit 14 may be positioned on a worksite 300. Worksite 300 may be adjacent to one or more roads 302, 304. Additionally, worksite 300 may include one or more entrances 306 (one shown in FIG. 3), for example, demarcated by one or more gates. Entrance 306 may include one or more entrance sensors 308, for example, two entrance sensors 308 on opposing sides of entrance 306. Additionally, worksite 300 may include a geofence 310, for example, a virtual fence or perimeter around a location. Geofence 310 may include an entirety or a portion of worksite 300. Alternatively, geofence 310 may be based on a position of vehicle 12, for example, a certain distance or radius from vehicle 12. In these aspects, control system 100 may establish and/or adjust geofence 310, for example, based on one or more parameters.

As discussed herein, one or more features of system 10 may be activated in pre-start or pre-conditioning procedures once user locator 18 is within a predetermined distance or other locational parameter from vehicle 12. In these aspects, controller 102 and/or user locator unit 118 may detect when user locator 18 is within a predetermined distance from vehicle 12, worksite 300, entrance 306, or another location, and may signal one or more HVAC or temperature control system(s) 104 to initiate the pre-start or pre-conditioning procedures. Alternatively or additionally, controller 102 and/or user locator unit 118 may detect when user locator 18 passes over or cross one or more locations or landmarks, and may signal one or more HVAC or temperature control system(s) 104 to initiate the pre-start or pre-conditioning procedures. For example, controller 102 and/or user locator unit 118 may detect (e.g., via a GPS unit) when user locator 18 turns from road 302 onto road 304. Alternatively, controller 102 and/or user locator unit 118 may detect (e.g., via a GPS unit and/or one or more of sensors 308) when user locator 18 enters worksite 300 via entrance 306. It is noted that if worksite 300 has more than one entrance 306, then controller 102 and/or user locator unit 118 may signal one or more HVAC or temperature control system(s) 104 to initiate the pre-start or pre-conditioning procedures when user locator 18 enters worksite 300 via any of the entrances 306. Alternatively, controller 102 and/or user locator unit 118 may signal one or more HVAC or temperature control system(s) 104 to initiate the pre-start or pre-conditioning procedures only when user locator 18 enters worksite 300 via one or a subset of the entrances 306.

As mentioned above, worksite 300 may include one or more geofences 310, for example, based on a size of worksite 300 and/or a position of vehicle 12. When geofence 310 is based on a location of vehicle 12, geofence 310 may be substantially circular, for example, extending in a predetermined distance or radius in 360 degrees from vehicle 12. In one or more aspects, geofence 310 may extend in a distance of approximately 50 meters, approximately 100 meters, approximately 200 meters, approximately 500 meters, approximately 1 kilometer, approximately 5 kilometers, approximately 10 kilometers, approximately 25 kilometers, approximately 50 kilometers, approximately 100 kilometers, etc. The size of geofence 310 may depend on one or more of a size of worksite 300, a type or size of vehicle 12, the one or systems of vehicle 12 that are to be pre-conditioned, etc. Controller 102 and/or user locator unit 118 may signal one or more HVAC or temperature control system(s) 104 to initiate the pre-start or pre-conditioning procedures when user locator 18 is within geofence 310. In some aspects, geofence 310 may be used for one or more functions on worksite 300. Geofence 310 may be used to detect the position of user locator 18, and may also be used to establish one or more boundaries for one or more vehicles on worksite, for example, limiting where the one or more vehicles can travel.

Additionally, in one or more aspects, the size (e.g., a diameter) of geofence 310 may at least partially depend on one or more parameters. In these aspects, geofence 310 may be a pre-start or pre-conditioning geofence. For example, if the ambient temperature (i.e., sensed by ambient temperature sensor 110) and/or one or more of the temperature of battery 20 (i.e., sensed by battery temperature sensor 112), the temperature of motor 22 (i.e., sensed by a motor temperature sensor), the temperature of cab 28 (i.e., sensed by cab temperature sensor 114), or the temperature of hydraulic system 36 (i.e., sensed by hydraulic temperature sensor 116) is lower or higher than one or more predetermined temperatures, then the size of geofence 310 may be larger (i.e., geofence 310A), as control system 100 may require more time to heat, cool, or ventilate one or more components of vehicle 12. Alternatively, if the ambient temperature and/or the temperature of one or more of battery 20, motor 22, cab 28, or hydraulic system 36 is more temperate, for example, within a predetermined temperature range (e.g., between approximately 0° C. and approximately 30° C., for example, between approximately 5° C. and approximately 25° C.) then geofence 310 may be smaller (i.e., geofence 310B), as control system 100 may require less time to heat, cool, or ventilate one or more components of vehicle 12.

In one aspect, geofence 310 may include incremental sizes. For example, if the ambient temperature and/or the temperature of one or more of battery 20, motor 22, cab 28, or hydraulic system 36 is above a first threshold temperature or below a second threshold temperature, then geofence 310 may expand, for example, to geofence 310A. Alternatively, if the ambient temperature and/or the temperature of one or more of battery 20, motor 22, cab 28, or hydraulic system 36 is within a more temperate temperature range, then geofence 310 may reduce in size, for example, to geofence 310B. Furthermore, if the ambient temperature and/or the temperature of one or more of battery 20, motor 22, cab 28, or hydraulic system 36 is above a third threshold temperature (i.e., higher than the first threshold temperature) or below a fourth threshold temperature (i.e., lower than the second threshold temperature), then geofence 310 may further expand, for example, to geofence 310C, as control system 100 may require even more time to heat, cool, or ventilate one or more components of vehicle 12. Alternatively, the size of geofence 310 may be directly proportional to the ambient temperature and/or the temperature of one or more of battery 20, motor 22, cab 28, or hydraulic system 36, for example, continuously variable between a minimum geofence size and a maximum geofence size based on the ambient temperature and/or the temperature of one or more of battery 20, motor 22, cab 28, or hydraulic system 36.

Additionally, geofence 310 may signal controller 102 to halt one or more pre-start or pre-conditioning procedures, for example, if user locator 18 is detected leaving geofence 310. For example, as shown in FIG. 3, user locator 18 may be within geofence 310A or geofence 310C while traveling on a portion of road 302, but user locator 18 may exit geofence 310 or geofence 310C when approaching road 304. Exiting geofence 310A or geofence 310C may pause or cancel the pre-start or pre-conditioning procedures. Alternatively, in one aspect, exiting geofence 310 (e.g., geofence 310A or 310C) may not affect the pre-start or pre-conditioning procedures.

Furthermore, in one or more aspects, the size of geofence 310 and/or the initiation of the pre-start or pre-conditioning procedures may be based on at least on one or more parameters of charging unit 14, for example, communicated to controller 102 via charger information unit 120. For example, if charging unit 14 is capable of delivering a greater amount of power and/or at a greater rate to battery 20, then geofence 310 may be smaller and/or controller 102 may delay the initiation of one or more pre-start or pre-conditioning procedures. Alternatively, if charging unit 14 is capable of delivering a lesser amount of power and/or at a slower rate to battery 20, then geofence 310 may be larger and/or controller 102 may initiate one or more pre-start or pre-conditioning procedures earlier. It is noted that the charging capabilities of charging unit 14 may also depend on the ambient temperature, a temperature of charging unit 14 (i.e., detected by a charging unit temperature sensor), and/or a temperature of cable 16 (i.e., detected by a cable temperature sensor).

In one aspect, the initiation of the pre-start or pre-conditioning procedures may depend on more than one user locators 18. For example, as shown in FIG. 3, another user locator 318 may be indicative of another user or operator. In this aspect, user locator 318 may be in communication with controller 102, and controller 102 may signal one or more components of vehicle 12 to initiate the pre-start or pre-conditioning procedures when one or both of user locators 18, 318 are within a predetermined distance or other locational parameter from vehicle 12, as discussed above. For example, controller 102 may only signal one or more components of vehicle 12 to initiate the pre-start or pre-conditioning procedures when both user locator 18 and user locator 318 have turned from road 302 onto road 304, have both passed through entrance 306, are both within geofence 310, etc. Although not shown, the initiation of the pre-start or pre-conditioning procedures may further depend on more than two user locators 18, 318. Additionally, the initiated pre-start or pre-conditioning procedures may depend on which user locator 18, 318 is within the predetermined distance. For example, if first user locator 18 is within geofence 310, then control system 100 may initiate a heating or cooling of battery 20 (e.g., via battery temperature control system 104A). Then, when second user locator 318 is within geofence 310, then control system 100 may initiate a heating or cooling of cab 28 (e.g., via cab temperature control system 104B).

Furthermore, as mentioned above, the initiation of the pre-start or pre-conditioning procedures may be based at least in part on a predetermined distance of user locator 18 to a remote operation location, for example, a remote operation location 312 on worksite 300. Alternatively, remote operation location 312 may be remote from worksite 300. In these aspects, controller 102 may determine an estimated arrival time for the user to remote operation location 312, as discussed herein.

Figure 4:
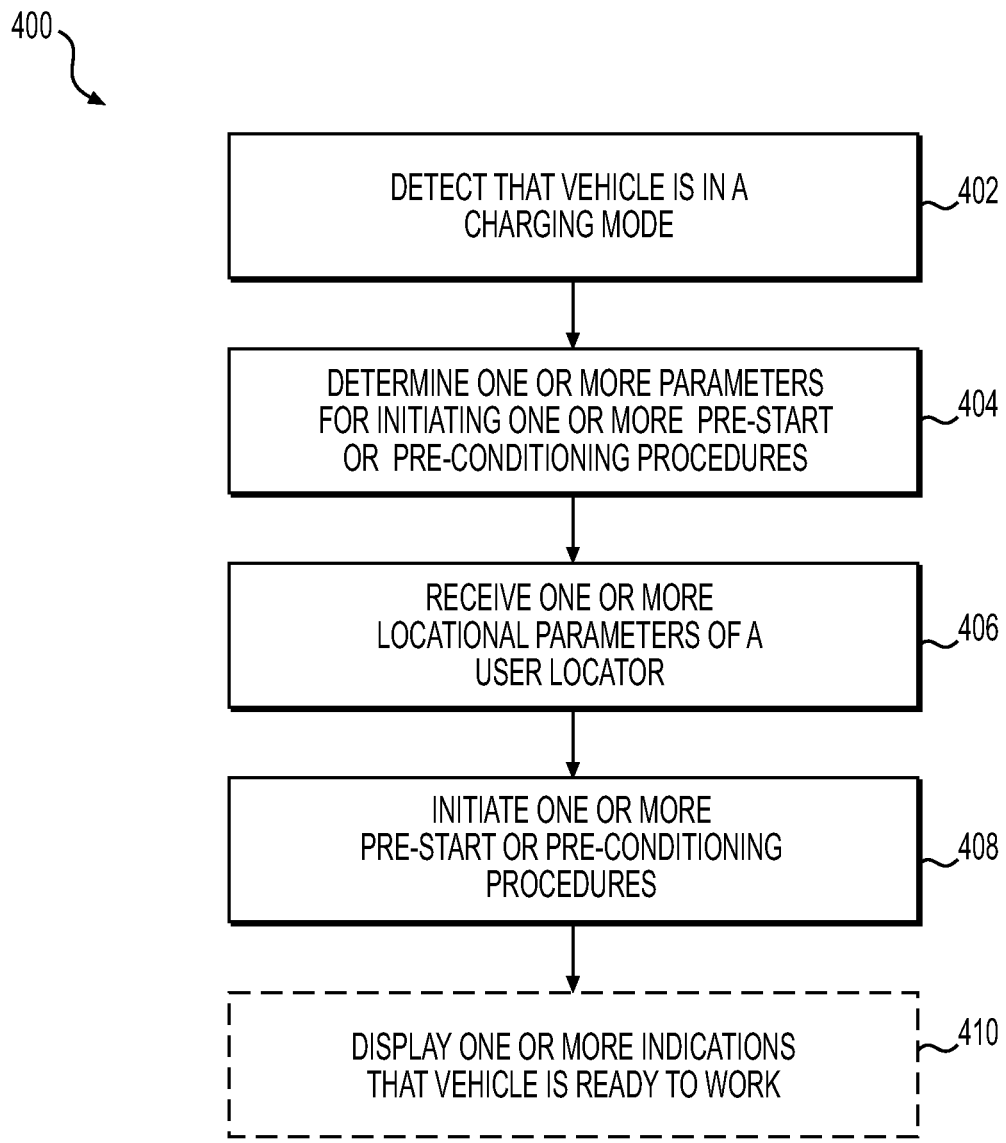
FIG. 4 is a flowchart depicting an exemplary method for controlling one or more start-up procedures for a vehicle or machine, according to aspects of this disclosure.

FIG. 4 is a flow diagram portraying an exemplary method 400 that may be performed by control system 100 to automatically control one or more aspects or portions of vehicle 12. For example, in a charging mode (i.e., with vehicle 12 connected to charging unit 14 via cable 16), control system 100 may control the initiation of one or more pre-start or pre-conditioning procedures. As mentioned above, the pre-start or pre-conditioning procedures may include one or more of warming one or more batteries 20, motor 22, cab 28, and/or hydraulic system(s) 36 (i.e., in cold climates), cooling one or more batteries 20, motor 22, cab 28, and/or hydraulic system(s) 36 (i.e., in hot climates), or otherwise conditioning one or more elements or portions of vehicle 12 before operation.

Method 400 includes an initial step 402, where controller 102 may determine or detect that vehicle 12 is in a charging mode, for example, connected to charging unit 14 via cable 16. For example, as mentioned above, charger information unit 120 may be configured to detect the connection between charging unit 14 and vehicle 12, and may send one or more signals indicative of the connection between vehicle 12 and charging unit 14. Alternatively, control system 100 may detect the connection of mounting portion 26 to charger coupling 24 and/or detect that battery 20 is being charged.

Method 400 also includes a step 404, in which controller 102 may determine one or more parameters for initiating one or more pre-start or pre-conditioning procedures. For example, controller 102 may receive one or more signals from ambient temperature sensor 110, battery temperature sensor 112, cab temperature sensor 114, hydraulic temperature sensor 116, etc., and may determine a power and/or amount of time required to warm, cool, ventilate, or otherwise condition one or more components of vehicle 12 before vehicle 12 is ready to work. In these aspects, colder or hotter temperatures may require a greater amount of power and/or a greater amount of time to bring the various components to a ready to work temperature than more temperate temperatures. Similarly, the power supply, power delivery rate, and/or other conditions of charging unit 14 and/or cable 16 may affect the amount of time required to condition vehicle 12 to be ready to work. In these aspects, step 404 may include setting one or more of a predetermined distance of user locator 18 to vehicle 12 at which the pre-start or pre-conditioning will begin. Step 404 may include setting and/or adjusting (either incrementally or continuously) a size of geofence 310.

Next, a step 406 includes receiving one or more locational parameters for user locator 18. In this aspect, step 406 may include controller 102 receiving locational data from user locator unit 118, for example, GPS positional data. Alternatively, step 406 may include controller 102 and/or user locator unit 118 detecting (e.g., via a GPS unit) when user locator 18 turns from road 302 onto road 304, detecting (e.g., via one or more of sensors 308) when user locator 18 enters worksite 300 via entrance 306, detecting (e.g., via a GPS unit) when user locator 18 enters or crosses over geofence 310, etc. Additionally, step 406 may include receiving one or more locations parameters for more than one user locators, for example, user locator 18 and user locator 318.

Method 400 also includes a step 408, in which control system 100 initiates one or more pre-start or pre-conditioning procedures. Step 408 may include warming one or more of battery 20, motor 22, cab 28, and/or hydraulic system(s) 36 (i.e., in cold climates), cooling battery 20, motor 22, cab 28, and/or hydraulic system(s) 36 (i.e., in hot climates), or otherwise conditioning (e.g., ventilating) one or more elements or portions of vehicle 12 before operation, as discussed above. Step 408 may include controller 102 signaling one or more temperature control system(s) 104, for example, one or more of battery temperature control system 104A, cab temperature control system 104B, hydraulic temperature control system 104C, or motor temperature control system(s) 108, as discussed above.

Method 400 may also include an optional last step 410, in which control system 100 may display one or more indications that vehicle 12 is ready to work, for example, that the temperature of one or more of battery 20, motor 22, cab 28, and/or hydraulics system(s) 36 has reached a working temperature. For example, controller 102 may signal one or more of user locator 18 or user interface 106 (e.g., in cab 28 or remote from vehicle 12) to display one or more indications (e.g., text messages, lights, notifications, etc.) or otherwise signal (e.g., an audible signal) that vehicle 12 is ready to work. For example, indicating that vehicle 12 is ready to work may include changing a red light (e.g., a blinking red light) on user interface 106 to a green light (e.g., a steady green light) on user interface 106. In this aspect, vehicle 12 may be ready work when, for example, battery 20 is fully charged, heated, and/or cooled to an operational temperature. Additionally or alternatively, vehicle 12 may be ready to work when one or more of motor 22, cab 28, hydraulics system(s) 36, etc. are heated, cooled, or otherwise conditioned to an operational temperature or other operational parameter.

INDUSTRIAL APPLICABILITY

The disclosed aspects of system 10, vehicle 12, control system 100, etc. may be used in any machine or vehicle to help initiate one or more pre-start or pre-conditioning procedures to assist in the operation of the machine or vehicle. The one or more pre-start or pre-conditioning procedures may be initiated while the machine or vehicle 12 is coupled to charging unit 14 (or other power source). As such, the pre-start or pre-conditioning procedures can occur while battery 20 is drawing power from charging unit 14. Battery 20 will power the various components of vehicle 12 for the pre-start or pre-conditioning procedures, but any drain on the power stored on battery 20 may be replaced by charging unit 14. As such, battery 20 may be fully charged (or approximately fully charged) when vehicle 12 is uncoupled from charging unit 14 and begins working, for example, on worksite 300. Because battery 20 may be fully charged (or approximately fully charged), battery 20 may provide an increased operational period for vehicle 12. In one aspect, if battery 20 provides an average operational period of approximately four to five hours, then initiating the pre-start or pre-conditioning procedures while vehicle 12 is connected to charging unit may increase the average operational period by, for example, approximately 10 minutes, approximately 15 minutes, approximately 20 minutes, approximately 30 minutes, approximately 45 minutes, approximately 1 hour, etc. In this aspect, initiating the one or more pre-start or pre-conditioning procedures while vehicle 12 is coupled to charging unit 14 may help to increase the operational period of vehicle 12 by, for example, approximately 2%, approximately 5%, approximately 10%, approximately 15%, approximately 20%, etc.

Furthermore, initiating the pre-start or pre-conditioning procedures while vehicle 12 is connected to charging unit 14 and before the operator arrives to vehicle 12 may also increase the productivity for the operator. For example, initiating the pre-start or pre-conditioning procedures based on the operator's position, via one or more of the parameters discussed herein, may result in one or more of battery 20, motor 22, cab 28, hydraulic system(s) 36, etc. being heated, cooled, or ventilated to an operating temperature or otherwise conditioned for vehicle 12 to be ready to work. As such, the operator may immediately begin operating vehicle 12, for example, when the operator arrives at vehicle 12 or arrives at another location (e.g., a remote operation location).

In some aspects, for example, when vehicle 12 includes cab 28, initiating the pre-start or pre-conditioning procedures while vehicle 12 is connected to charging unit 14 and before the operator arrives to vehicle 12 may also improve operator comfort. For example, initiating the pre-start or pre-conditioning procedures based on the operator's position, via one or more of the parameters discussed herein, may result in cab 28 being warmed, cooled, ventilated, etc. before the operator arrives. In these aspects, the operator need not operate vehicle 12 in a cold cab (when operating in cold conditions) or in a hot cab (when operating in hot conditions).

Moreover, one or more aspects of this disclosure may provide for the initiation of the pre-start or pre-conditioning procedures to be adjustable. For example, as discussed above, when the ambient temperature is more extreme (e.g., hotter or colder relative to one or more predetermined thresholds) and/or when charging unit 14 is less powerful or delivers a slower charge to vehicle 12 and battery 20, control system 100 (e.g., via controller 102) may adjust geofence 310 or otherwise initiate the pre-start or pre-conditioning procedures earlier. For example, in these circumstances, controller 102 may adjust geofence 310 or otherwise initiate the pre-start or pre-conditioning procedures when the operator (via operator locator 18) is farther away from vehicle 12 (or remote operation location 312).

In some aspects, when vehicle 12 is in an extremely cold climate, control system 100 may maintain one or more components of vehicle 12 at a first temperature (or within a temperature range) while inactive (e.g., maintain battery 20 at a charging temperature, maintain cab 28 at an idle temperature, etc.). Then, control system 100 may further warm the one or more components to a second temperature warmer than the first temperature when initiating the pre-start or pre-conditioning procedures (e.g., warm battery 20 to an operating temperature, warm cab 28 to an operating temperature, etc.). Alternatively, when in an extremely hot climate, control system 100 may maintain one or more components of vehicle 12 at a third temperature (or within a temperature range) while inactive (e.g., maintain battery 20 at a third temperature or temperature range while charging, maintain cab 28 at an idle temperature, etc.). Then, control system 100 may further cool one or more components to a fourth temperature cooler than the third temperature when initiating the pre-start or pre-conditioning procedures (e.g., cool battery 20 to an operating temperature, cool cab 28 to an operating temperature, etc.). Furthermore, in some aspects, the initiation of the pre-start or pre-conditioning procedures may also depend on the position of more than one user locators 18, 318, for example, if vehicle 12 requires more than one operator to begin work.

Various aspects of this disclosure may help to improve the efficiency and/or effectiveness of one or more vehicles 12. Additionally, various aspects of this disclosure may help to improve the efficiency of operator time, as vehicle 12 may be operational or otherwise ready to work when the operator arrives at the vehicle or another location (e.g., a remote operation location), which may help to reduce vehicle downtime, operator costs, etc.

It will be apparent to those skilled in the art that various modifications and variations can be made to the disclosed system, vehicle, and control system without departing from the scope of the disclosure. Other embodiments of the system, vehicle, and control system will be apparent to those skilled in the art from consideration of the specification and practice of the system, vehicle, and control system disclosed herein. It is intended that the specification and examples be considered as exemplary only, with a true scope of the disclosure being indicated by the following claims and their equivalents.

What is claimed is:

1. A machine charging system, comprising:
    a machine, wherein the machine includes:
        one or more batteries;
        a cab;
        an ambient temperature sensor; and
        a temperature control system;
    a charging unit configured to be removably coupled to the machine via a cable;
    at least one user locator; and
    a control system, wherein the control system includes a controller in communication with the at least one user locator, the ambient temperature sensor, and the temperature control system,
    wherein, when the controller detects (1) that the at least one user locator is within a predetermined distance from the machine and (2) that the machine is coupled to the charging unit, then the controller initiates one or more pre-start or pre-conditioning procedures with the temperature control system to control a temperature of one or more components of the machine,
    wherein the predetermined distance is determined by a geofence, and
    wherein the controller adjusts a size of the geofence based at least in part on a temperature sensed by the ambient temperature sensor.

2. The system of claim 1, wherein the control system further includes a charger information unit in communication with the controller, wherein the controller adjusts the size of the geofence based at least in part on a rate at which power is delivered from the charging unit to the one or more batteries.

3. The system of claim 1, wherein the predetermined distance is determined by the at least one user locator passing one or more locations or landmarks, and wherein the at least one user locator is a cellphone, smartphone, tablet, or operator vest.

4. The system of claim 1, wherein the machine further includes a battery temperature control system, and wherein the one or more pre-start or pre-conditioning procedures include warming or cooling the one or more batteries with the battery temperature control system.

5. The system of claim 1, wherein the machine further includes one or more hydraulics systems, one or more implements movable via the one or more hydraulics systems, and a hydraulics temperature control system, and wherein the one or more pre-start or pre-conditioning procedures include warming or cooling the one or more hydraulics systems with the hydraulics temperature control system.

6. The system of claim 1, wherein the at least one user locator is two user locators, and wherein the controller initiates the one or more pre-start or pre-conditioning procedures to control the temperature of the cab when the controller detects that both of the two user locators are within the predetermined distance from the machine.

7. A method of automatically initiating one or more pre-start or pre-conditioning procedures for a machine having one or more batteries and one or more hydraulics systems, comprising:
    detecting that the machine is in a charging mode, wherein the charging mode includes the machine being coupled to a charging unit, and wherein the machine includes a cab;
    determining one or more parameters for initiating the one or more pre-start or pre-conditioning procedures for the machine;
    receiving one or more locational parameters for at least one user locator separate from the machine; and
    when the one or more location parameters for the at least one user locator are within the determined parameters, initiating the one or more pre-start or pre-conditioning procedures to control a temperature of the cab, a temperature of the one or more batteries, and a temperature of the one or more hydraulics systems while the machine is coupled to the charging unit.

8. The method of claim 7, wherein determining the one or more parameters for initiating the one or more pre-start or pre-conditioning procedures for the machine includes establishing a geofence.

9. The method of claim 8, wherein determining the one or more parameters for initiating the one or more pre-start or pre-conditioning procedures for the machine further includes receiving one or more signals indicative of an ambient temperature.

10. The method of claim 9, wherein if the ambient temperature is outside of a predetermined range, determining the one or more parameters for initiating the one or more pre-start or pre-conditioning procedures for the machine includes increasing a size of the geofence.

11. The method of claim 7, wherein receiving one or more locational parameters for the at least one user locator includes receiving one or more signals indicative of the at least one user locator passing one or more locations or landmarks, and wherein the at least one user locator is a cellphone, smartphone, tablet, or operator vest.

12. The method of claim 11, wherein the at least one user locator is two user locators, and wherein receiving one or more locational parameters for the two user locators includes receiving signals indicative of both of the two user locators passing the one or more locations or landmarks.

13. The method of claim 7, wherein the machine further includes a battery temperature control system, wherein initiating the one or more pre-start or pre-conditioning procedures includes warming or cooling the one or more batteries with the battery temperature control system,
    wherein the machine further includes one or more implements movable via the one or more hydraulics systems and a hydraulics temperature control system, and wherein initiating the one or more pre-start or pre-conditioning procedures includes warming or cooling the one or more hydraulics systems with the hydraulics temperature control system.

14. The method of claim 7, further comprising a last step of displaying one or more indications that the machine is ready to work via the at least one user locator or a user interface after the temperature of cab has reached a working temperature.

15. A machine charging system, comprising:
a machine, wherein the machine includes:
one or more batteries;
a battery temperature control system powered by the one or more batteries;
a cab;
a cab temperature control system powered by the one or more batteries; and
an ambient temperature sensor;
a charging unit configured to be removably coupled to the machine via a cable;
at least one user locator; and
a control system, wherein the control system includes a controller in communication with the at least one user locator, the battery temperature control system, the cab temperature control system, and the ambient temperature sensor,
wherein, when the controller detects (1) that the at least one user locator is within a predetermined distance from the machine and (2) that the machine is coupled to the charging unit, then the controller initiates one or more pre-start or pre-conditioning procedures with the battery temperature control system to control a temperature of the battery and with the cab temperature control system to control a temperature of the cab,
wherein the predetermined distance is determined by a geofence,
wherein the ambient temperature sensor is in communication with the controller, and
wherein the controller adjusts a size of the geofence based at least in part on a temperature sensed by the ambient temperature sensor.

16. The system of claim 15,
wherein the at least one user locator is a cellphone, smartphone, tablet, or operator vest.

17. The system of claim 15, wherein the machine further includes one or more hydraulics systems, one or more implements movable via the one or more hydraulics systems, and a hydraulics temperature control system powered by the one or more batteries, and wherein the one or more pre-start or pre-conditioning procedures include warming or cooling the one or more hydraulics systems with the hydraulics temperature control system, and
wherein the at least one user locator is a cellphone, smartphone, tablet, or operator vest.

18. The system of claim 15, wherein the at least one user locator includes at least two user locators, and wherein the controller detecting that the at least one user locator is within the predetermined distance from the machine includes receiving signals indicative of each of the at least two user locators being within the predetermined distance from the machine.

19. The system of claim 18, wherein each of the at least two user locators is one of a cellphone, smartphone, tablet, or operator vest.

20. The system of claim 15, wherein the machine further comprises a user interface in communication with the controller, wherein the controller is configured to signal the user interface to display one or more indications that the machine is ready to work after the temperature of battery and the temperature of the cab have reached respective working temperatures.

* * * * *